(12) United States Patent
Kapolka et al.

(10) Patent No.: US 7,092,803 B2
(45) Date of Patent: Aug. 15, 2006

(54) REMOTE MONITORING, CONFIGURING, PROGRAMMING AND DIAGNOSTIC SYSTEM AND METHOD FOR VEHICLES AND VEHICLE COMPONENTS

(75) Inventors: Michael Kapolka, Sterling Heights, MI (US); Sam Chang, West Bloomfield, MI (US); Brian Crull, Clarkston, MI (US); Andrew Ditchfield, New Hudson, MI (US); William Bromley, Lapeer, MI (US)

(73) Assignee: IDSC Holdings, LLC, Kenosha, WI (US)

( * ) Notice: Subject to any disclaimer, the term of this patent is extended or adjusted under 35 U.S.C. 154(b) by 312 days.

(21) Appl. No.: 10/091,096

(22) Filed: Mar. 4, 2002

(65) Prior Publication Data

US 2004/0138790 A1    Jul. 15, 2004

Related U.S. Application Data

(63) Continuation-in-part of application No. 09/640,785, filed on Aug. 18, 2000, now abandoned.

(60) Provisional application No. 60/351,165, filed on Jan. 23, 2002.

(51) Int. Cl.
*G01M 17/00*    (2006.01)
*G06F 7/00*    (2006.01)
*G06F 19/00*    (2006.01)

(52) U.S. Cl. .................. 701/29; 701/30; 701/33; 701/34; 340/989; 340/3.1; 340/3.32; 340/825.36

(58) Field of Classification Search ............... 701/29, 701/33, 34, 39, 30, 2; 340/989, 3.1, 3.32, 340/825.36, 825.37
See application file for complete search history.

(56) References Cited

U.S. PATENT DOCUMENTS 4,067,061 A    1/1978   Juhasz ........................ 360/5
4,258,421 A    3/1981   Juhasz et al. ................ 701/35

(Continued)

FOREIGN PATENT DOCUMENTS

DE    44 23 328 A1    1/1996

(Continued)

OTHER PUBLICATIONS

U.S. Appl. No. 09/640,785, filed Aug. 18, 2000, Bromley et al.

(Continued)

*Primary Examiner*—Thomas G. Black
*Assistant Examiner*—Brian J. Broadhead
(74) *Attorney, Agent, or Firm*—McDonnell Boehnen Hulbert & Berghoff LLP

(57) ABSTRACT

A system and method for monitoring, configuring, programming and/or diagnosing operation of at least one vehicle includes an on-board unit disposed on the vehicle to send and receive data corresponding to at least one vehicle operating characteristic, a plurality of modular applications, each application having an associated function that processes the data corresponding to said at least one vehicle operating characteristic obtained via the on-board unit, and an interface that allows selection among the plurality of modular applications to create a customized system.

37 Claims, 8 Drawing Sheets

U.S. PATENT DOCUMENTS

| | | | |
|---|---|---|---|
| 4,630,292 A | 12/1986 | Juricich et al. | 377/20 |
| 4,677,429 A | 6/1987 | Glotzbach | 340/711 |
| 4,809,177 A | 2/1989 | Windle et al. | 701/1 |
| 4,926,331 A | 5/1990 | Windle et al. | 701/35 |
| 4,939,652 A | 7/1990 | Steiner | 701/35 |
| 5,337,236 A | 8/1994 | Fogg et al. | 701/35 |
| 5,359,528 A | 10/1994 | Haendel et al. | 701/35 |
| 5,426,585 A | 6/1995 | Stepper et al. | 702/85 |
| 5,442,553 A | 8/1995 | Parrillo | 455/420 |
| 5,579,233 A | 11/1996 | Burns | 700/250 |
| 5,581,464 A | 12/1996 | Woll et al. | 701/35 |
| 5,612,875 A | 3/1997 | Haendel et al. | 701/35 |
| 5,619,412 A | 4/1997 | Hapka | 701/36 |
| 5,648,768 A | 7/1997 | Bouve | 340/988 |
| 5,680,328 A | 10/1997 | Skorupski et al. | 701/35 |
| 5,694,322 A | 12/1997 | Westerlage et al. | 705/417 |
| 5,708,308 A | 1/1998 | Katayama et al. | 307/10.5 |
| 5,721,678 A | 2/1998 | Widl | 705/417 |
| 5,729,458 A | 3/1998 | Poppen | 705/400 |
| 5,732,074 A | 3/1998 | Spaur et al. | 370/313 |
| 5,742,915 A | 4/1998 | Stafford | 702/35 |
| 5,787,373 A | 7/1998 | Migues et al. | 701/33 |
| 5,803,043 A | 9/1998 | Bayron et al. | 123/335 |
| 5,815,071 A | 9/1998 | Doyle | 340/439 |
| 5,815,822 A | 9/1998 | Lu | 701/2 |
| 5,831,519 A | 11/1998 | Pederson et al. | 340/425.5 |
| 5,835,376 A | 11/1998 | Smith et al. | 701/117 |
| 5,835,868 A | 11/1998 | McElroy et al. | 701/2 |
| 5,844,987 A | 12/1998 | Matthews et al. | 380/9 |
| 5,864,831 A | 1/1999 | Schuessler | 705/417 |
| 5,917,434 A | 6/1999 | Murphy | 340/991 |
| 5,928,291 A | 7/1999 | Jenkins et al. | 701/1 |
| 5,937,421 A | 8/1999 | Petrov et al. | 707/526 |
| 5,938,716 A | 8/1999 | Shutty et al. | 701/115 |
| 5,953,706 A | 9/1999 | Patel | 705/6 |
| 5,954,773 A | 9/1999 | Luper | 701/35 |
| 5,974,356 A | 10/1999 | Doyle et al. | 701/209 |
| 5,974,396 A | 10/1999 | Anderson et al. | 705/10 |
| 5,999,876 A | 12/1999 | Irons et al. | 701/115 |
| 6,008,740 A | 12/1999 | Hopkins | 340/905 |
| 6,026,384 A | 2/2000 | Poppen | 705/400 |
| 6,060,981 A | 5/2000 | Landes | 340/426 |
| 6,064,929 A | 5/2000 | Migues | 701/35 |
| 6,078,873 A | 6/2000 | Shutty et al. | 702/89 |
| 6,085,725 A | 7/2000 | Goode et al. | 123/357 |
| 6,087,965 A | 7/2000 | Murphy | 340/991 |
| 6,088,650 A | 7/2000 | Schipper et al. | 701/207 |
| 6,089,207 A | 7/2000 | Goode et al. | 123/357 |
| 6,091,340 A | 7/2000 | Lee et al. | 340/825.71 |
| 6,108,591 A | 8/2000 | Segal et al. | 701/1 |
| 6,111,539 A | 8/2000 | Mannings et al. | 342/357.09 |
| 6,157,317 A | 12/2000 | Walker | 340/825.44 |
| 6,167,333 A | 12/2000 | Gehlot | 701/35 |
| 6,169,515 B1 | 1/2001 | Mannings et al. | 342/357.1 |
| 6,181,995 B1 | 1/2001 | Luper et al. | 701/35 |
| 6,185,501 B1 | 2/2001 | Smith et al. | 701/200 |
| 6,195,023 B1 | 2/2001 | Walsh et al. | 340/988 |
| 6,204,772 B1 | 3/2001 | DeMay et al. | 340/686.1 |
| 6,226,577 B1 | 5/2001 | Yeo | 701/35 |
| 6,232,874 B1 | 5/2001 | Murphy | 340/426 |
| 6,253,129 B1 | 6/2001 | Jenkins et al. | 701/29 |
| 6,259,988 B1 | 7/2001 | Galkowski et al. | 701/202 |
| 6,263,268 B1 | 7/2001 | Nathanson | 701/29 |
| 6,275,585 B1 | 8/2001 | Ablay et al. | 380/2 |
| 6,278,935 B1 | 8/2001 | Kaplan et al. | 701/200 |
| 6,292,724 B1 | 9/2001 | Apsell et al. | 701/29 |
| 6,295,492 B1 | 9/2001 | Lang et al. | 701/33 |
| 6,317,668 B1 | 11/2001 | Thibault | 701/35 |
| 6,389,337 B1 * | 5/2002 | Kolls | 701/29 |
| 6,636,790 B1 * | 10/2003 | Lightner et al. | 701/33 |
| 2001/0018628 A1 | 8/2001 | Jenkins et al. | 701/35 |
| 2001/0020204 A1 | 9/2001 | Runyon et al. | 701/35 |
| 2002/0007237 A1 | 1/2002 | Phung et al. | 701/33 |
| 2002/0016655 A1 | 2/2002 | Joao | 701/35 |
| 2002/0049523 A1 * | 4/2002 | Diaz et al. | 701/33 |
| 2002/0133273 A1 * | 9/2002 | Lowrey et al. | 701/29 |
| 2002/0156558 A1 * | 10/2002 | Hanson et al. | 701/33 |
| 2002/0173885 A1 * | 11/2002 | Lowrey et al. | 701/29 |
| 2002/0177926 A1 * | 11/2002 | Lockwood et al. | 701/1 |
| 2003/0004624 A1 * | 1/2003 | Wilson et al. | 701/33 |
| 2003/0093199 A1 * | 5/2003 | Mavreas | 701/33 |
| 2003/0105565 A1 | 6/2003 | Loda et al. | 701/33 |
| 2004/0039504 A1 * | 2/2004 | Coffee et al. | 701/35 |

FOREIGN PATENT DOCUMENTS

| | | |
|---|---|---|
| EP | 0 681 951 A1 | 11/1995 |
| EP | 0 581 558 B1 | 4/1997 |
| EP | 1 081 670 A2 | 3/2001 |
| EP | 1 128 333 A2 | 8/2001 |
| GB | 1 398 005 | 6/1975 |
| GB | 2 288 892 A | 11/1995 |
| GB | 2 340 974 A | 3/2000 |
| GB | 2 348 090 A | 9/2000 |
| KR | 0153605 | 5/1997 |
| TW | 3 66 478 | 8/1999 |
| WO | WO 01/38145 A1 | 5/2001 |
| WO | PCT/US01/024616 | 8/2001 |
| WO | WO 02/17184 A1 | 2/2002 |

OTHER PUBLICATIONS

U.S. Appl. No. 10/082,847, filed Feb. 26, 2002, Kapolka et al.
U.S. Appl. No. 10/084,800, filed Feb. 27, 2002, Kapolka et al.
U.S. Appl. No. 10/229,757, filed Aug. 28, 2002, Kapolka
U.S. Appl. No. 10/344,976, filed Feb. 18, 2003, Bromley et al.
U.S. Appl. No. 10/358,637, filed Feb. 5, 2003, Kapolka et al.
U.S. Appl. No. 10/505,700, filed Aug. 25, 2004, Kapolka et al.
U.S. Appl. No. 10/506,923, filed Sep. 3, 2004, Kapolka et al.
U.S. Appl. No. 10/709,500, filed May 10, 2004, Kapolka et al.
U.S. Appl. No. 10/823,271, filed Feb. 12, 2004, Kapolka et al.
U.S. Appl. No. 10/823,804, filed Apr. 12, 2004, Kapolka et al.
U.S. Appl. No. 10/853,513, filed May 24, 2004, Dils et al.
Korean Office Action mailed Nov. 16, 2004. (translation included).

* cited by examiner

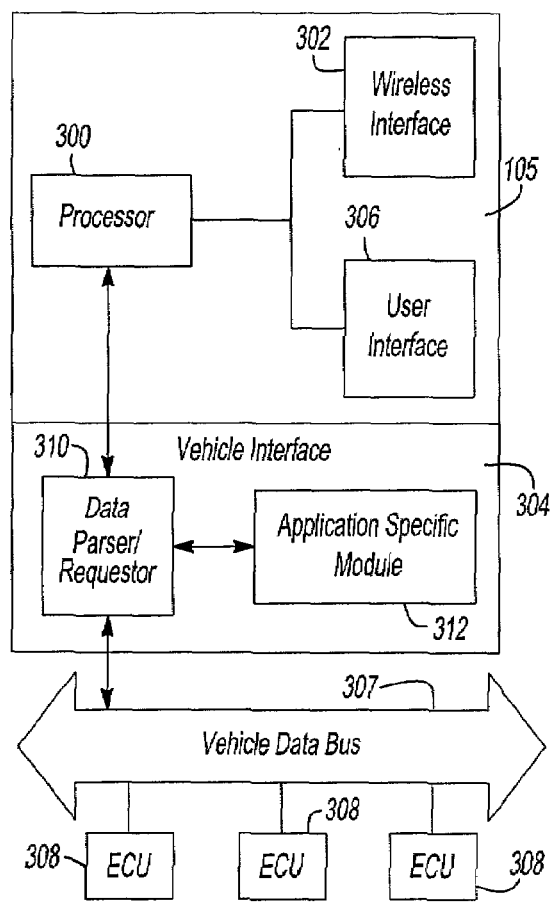
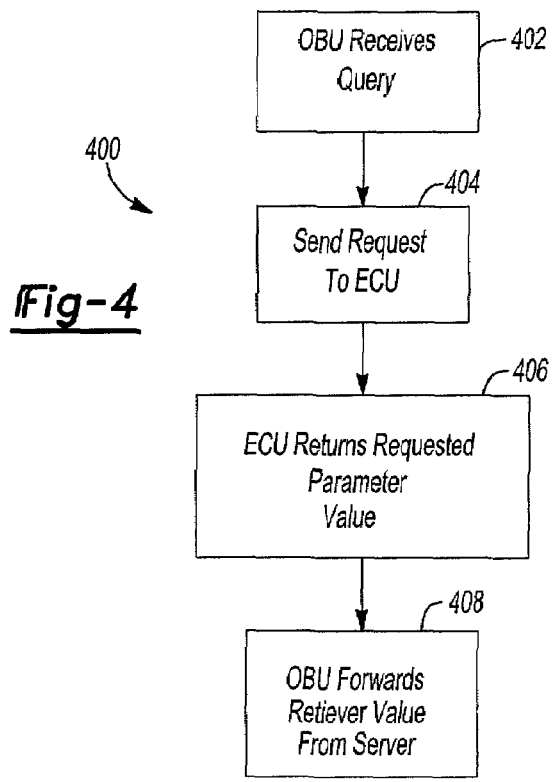

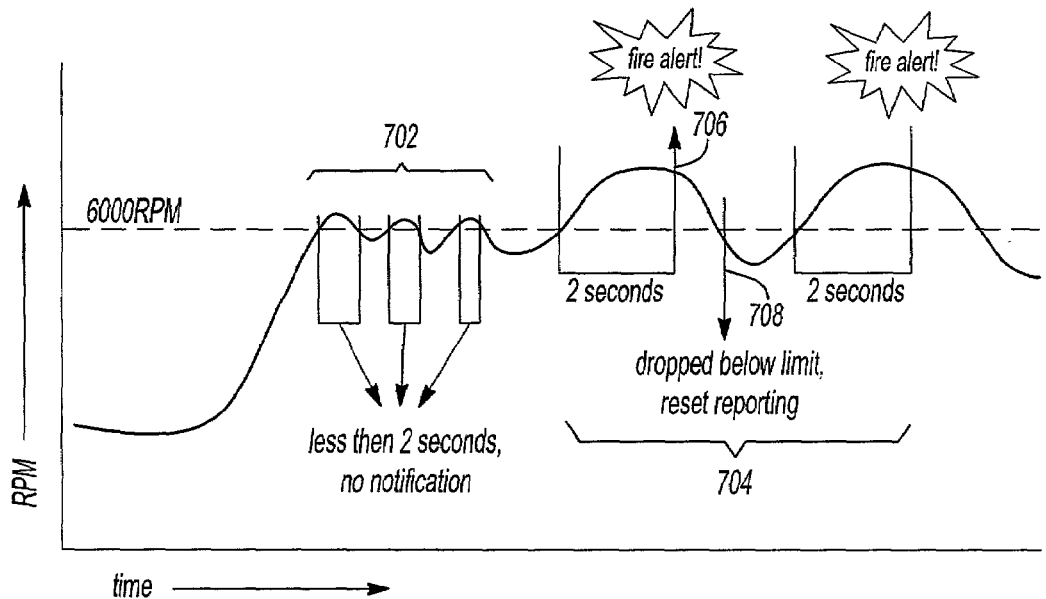
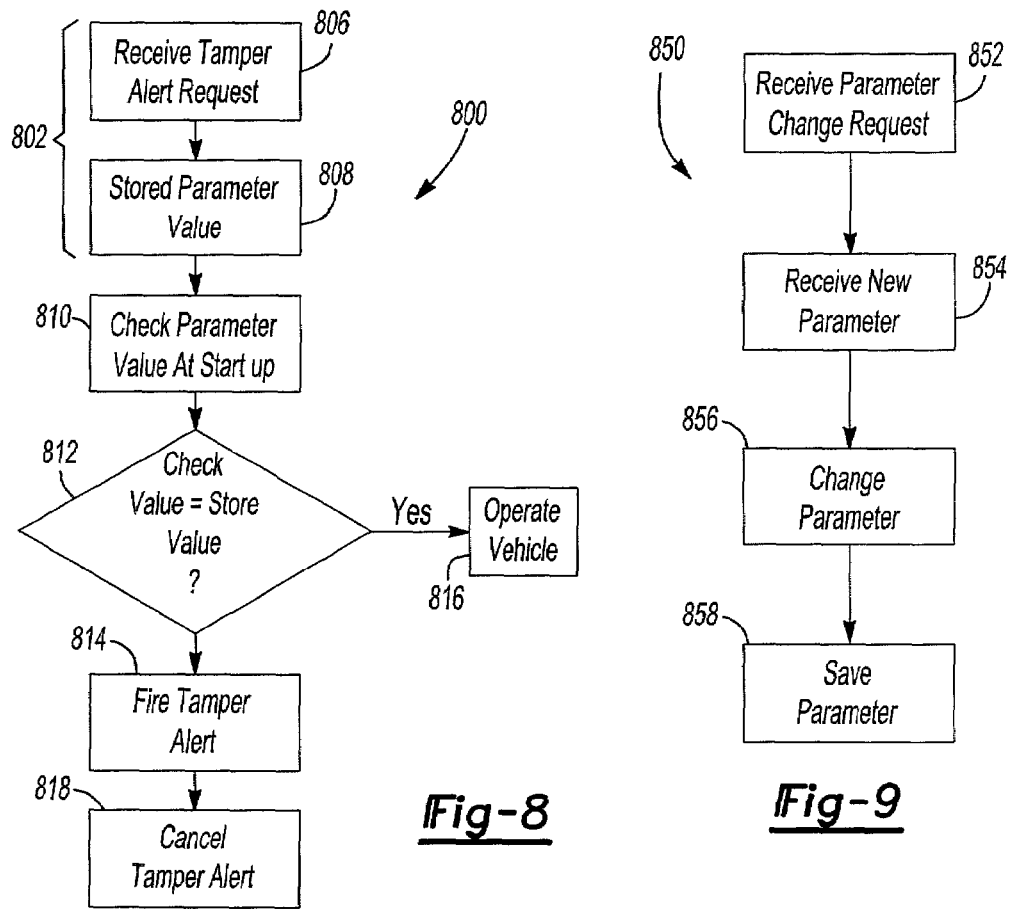

REMOTE MONITORING, CONFIGURING, PROGRAMMING AND DIAGNOSTIC SYSTEM AND METHOD FOR VEHICLES AND VEHICLE COMPONENTS

REFERENCE TO RELATED APPLICATIONS

This application is a continuation-in-part of commonly assigned, co-pending U.S. patent application Ser. No. 09/640,785, filed Aug. 18, 2000 now abandoned entitled "System, Method and Computer Program Product for Remote Vehicle Diagnostics, Monitoring, Configuring and Reprogramming" to Bromley et al., the disclosure of which is incorporated by reference in its entirety. This application also claims the benefit of U.S. Provisional Application No. 60/351,165 entitled "Wireless Communication Framework", filed Jan. 23, 2002, the disclosure of which is incorporated herein by reference in its entirety.

TECHNICAL FIELD

The present invention relates generally to computer data and information systems, and more particularly to computer tools for storing, processing, and displaying vehicle information.

BACKGROUND OF THE INVENTION

It is common for companies to own a large number, or fleet, of commercial motor vehicles. Typical examples of such companies include commercial courier services, moving companies, freight and trucking companies, truck leasing companies, as well as passenger vehicle leasing companies and passenger carriers. To maintain profitability, a company owning a vehicle fleet ideally minimizes the time spent in vehicle maintenance and repair. Maintaining optimum vehicle performance often involves removing vehicles from service to conduct fault analysis, scheduled maintenance, diagnostics monitoring and parameter modifications.

Further, companies that manufacture vehicle components may wish to have a central database to access information for product improvements, warranty service, diagnostics, and other component data after components have been installed on the vehicle. Because different companies and different industries have different vehicle data gathering and reporting needs, current solutions involve constructing specialized systems for each particular user application.

There is a desire for a system that can monitor, configure, program and diagnose vehicles and/or vehicle components while allowing customization of the vehicle data to accommodate the different needs of different users and different.

SUMMARY OF THE INVENTION

Accordingly, one embodiment of the present invention is directed to a system for monitoring, configuring, programming and/or diagnosing operation of at least one vehicle, comprising an on-board unit disposed on the vehicle to send and receive data corresponding to at least one vehicle operating characteristic, a plurality of modular applications, each application having an associated function that processes the data corresponding to said at least one vehicle operating characteristic obtained via the onboard unit, and an interface that allows selection among the plurality of modular applications to create a customized.

Another embodiment of the invention is directed to an on-board unit disposed on a vehicle for use in a system for monitoring, configuring, programming and/or diagnosing operation of at least one vehicle, comprising at least one on-board unit interface to support communication between the on-board unit and at least one device outside the on-board unit, a processor that manages the data sent and received by the on-board unit via said at least one interface, and a memory coupled to the processor.

A further embodiment of the present invention is directed to a method for monitoring, configuring, programming and/or diagnosing operation of at least one vehicle, comprising obtaining data corresponding to at least one vehicle operating characteristic from an on-board unit on the vehicle, providing a plurality of modular applications that are selectable by the user to create a customized system, and processing the data corresponding to at least one vehicle operating characteristic obtained via the on-board unit according to at least one function associated with at least one selected modular application.

Further embodiments and variations of the invention will be apparent from the drawings and description below.

BRIEF DESCRIPTION OF THE DRAWINGS

FIGS. 3A and 3B are representative block diagrams of one embodiment of an on-board unit in one embodiment of the present invention;

FIG. 4 is a block diagram of a parameter retrieval process according to one embodiment of the present invention;

FIG. 7 is a graph illustrating the operation of a threshold alert process according to one embodiment of the present invention;

FIG. 8 is a block diagram illustrating the operation of a tamper alert process according to one embodiment of the present invention;

FIG. 9 is a block diagram illustrating a parameter change process according to one embodiment of the invention;

DETAILED DESCRIPTION OF THE EMBODIMENTS

System Functionalities and Architecture

Figure 1:
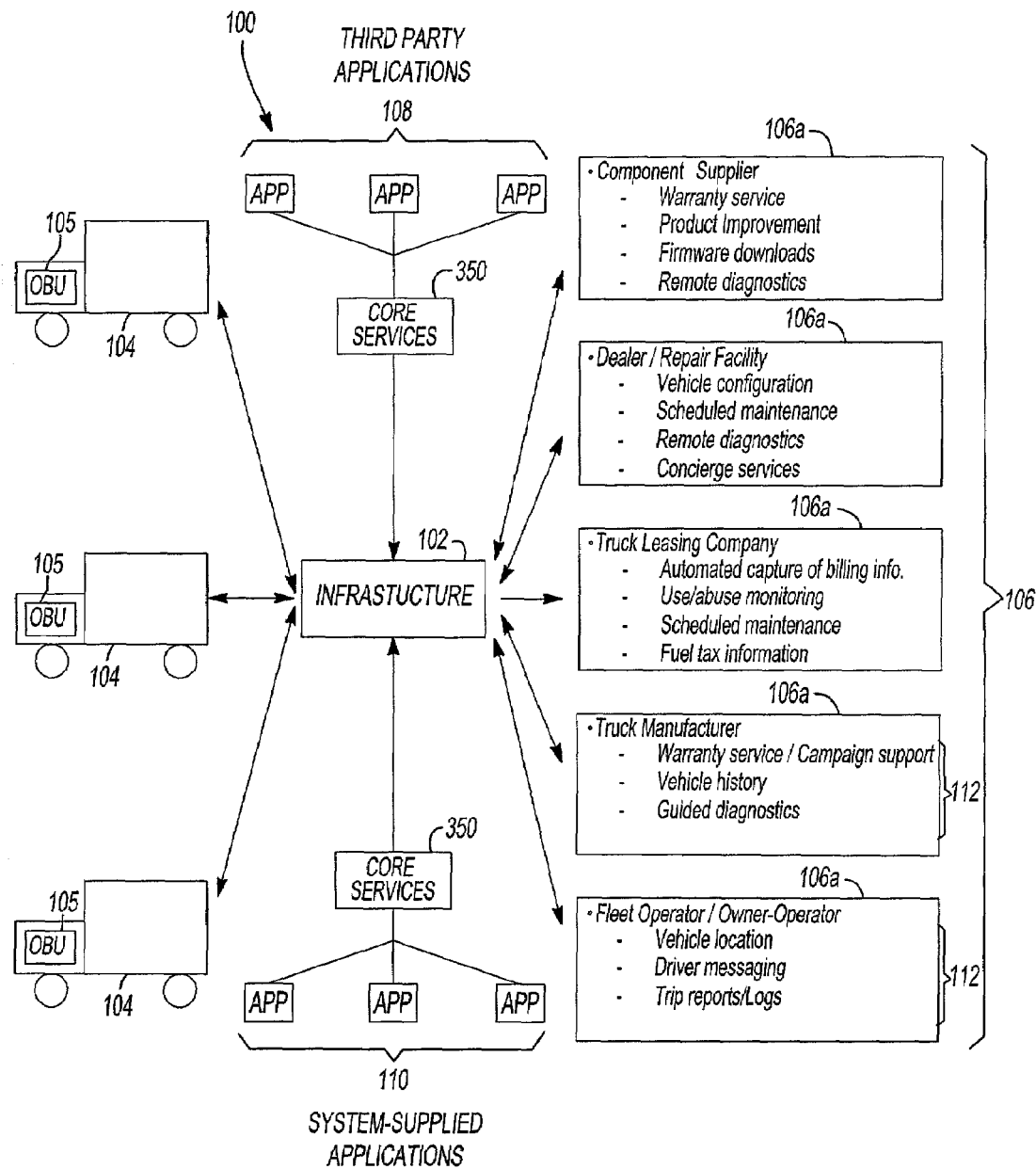
FIG. 1 is a representative functional block diagram illustrating an overall system according to one embodiment of the present invention.

FIG. 1 is a representative functional diagram of a vehicle monitoring and diagnostics system 100 according to one embodiment of the present invention. Generally, the inventive system 100 allows monitoring and control of a vehicle fleet by displaying and controlling data according to a user's customized specifications. The system 100 is designed with modular applications that interact with core data and services so that vehicle parameters can be monitored, analyzed and displayed in a format that is meaningful to a particular user and/or a particular industry. This flexibility allows different users and/or industries to use the same overall system 100 for vehicle and component monitoring despite their disparate vehicle data requirements.

Referring to the Figure, the system 100 may include an application service provider (ASP) infrastructure 102 that acts as a gateway between a plurality of vehicles 104, each vehicle having an associated on-vehicle computer (e.g., an onboard unit or "OBU" 105) and customizable interface 106. The interface 106 allows a user or machine 106a to select among various applications, such as third-party applications 108 as well as original, system-supplied applications 110, to obtain and analyze various data from the vehicles 104. The applications may include, for example, tools for obtaining real-time fleet characteristics, trend analysis and diagnostics, to perform manual, dynamic or rule-based configuration, as well as allow fleet managers to provide real-time driver/fleet notification. To ensure that the user receives data that is meaningful to the user's specific application, the user interface 106 can be customized to operate applications selected by the user. In the example shown in FIG. 1, different types of users 106a may select different applications as a customized application group 112 to accommodate their specific data monitoring and reporting needs applicable to their own business.

For example, as illustrated in FIG. 1, a dealer/repair facility may select from the offered applications 108, 110, vehicle configuration, scheduled maintenance, remote diagnostics, and concierge services as its application group 112, while a truck manufacturer may select a different collection of applications 112, such as warranty service/campaign support, vehicle history, and guided diagnostics. By offering a variety of modular applications 108, 110, that can be selected and combined according to the needs of a particular user, the same infrastructure 102 can be customized and used by different users for different purposes with little or no modification of the infrastructure 102 itself. Further, by allowing users to access third-party applications 108 through the same infrastructure as system supplied applications 110, the system 100 can leverage services not provided by the system 100 itself, further increasing flexibility and adaptability.

Further, in an embodiment of the inventive system using an ASP-based model, an application service provider provides and allows access, on a subscriber basis, to a remote vehicle diagnostics, monitoring, configuration and reprogramming tool via the Internet. That is, the application service provider provides the hardware (e.g., servers, an on-vehicle computer) and software (e.g., database) infrastructure, application software, customer support, and billing mechanism to allow its customers (e.g., fleet managers, vehicle distributors, vehicle dealers, original equipment manufacturers ("OEMs"), leasing/rental companies, and the like) to remotely access the vehicles within a fleet. The tool can be used by subscribers to select and access the modular applications 108, 110.

Note that an ASP-based model can eliminate the need to physically distribute software to users. Instead, new features and updates can be immediately available to users because the system resides and runs on an application server. In one embodiment, applications that are not on the application server can reside on the OBU 105. The on-board unit applications can be loaded onto the OBU 105 during vehicle installation, and additional applications or application updates can be downloaded onto the OBU 105 through a wireless network connection.

Figure 2:
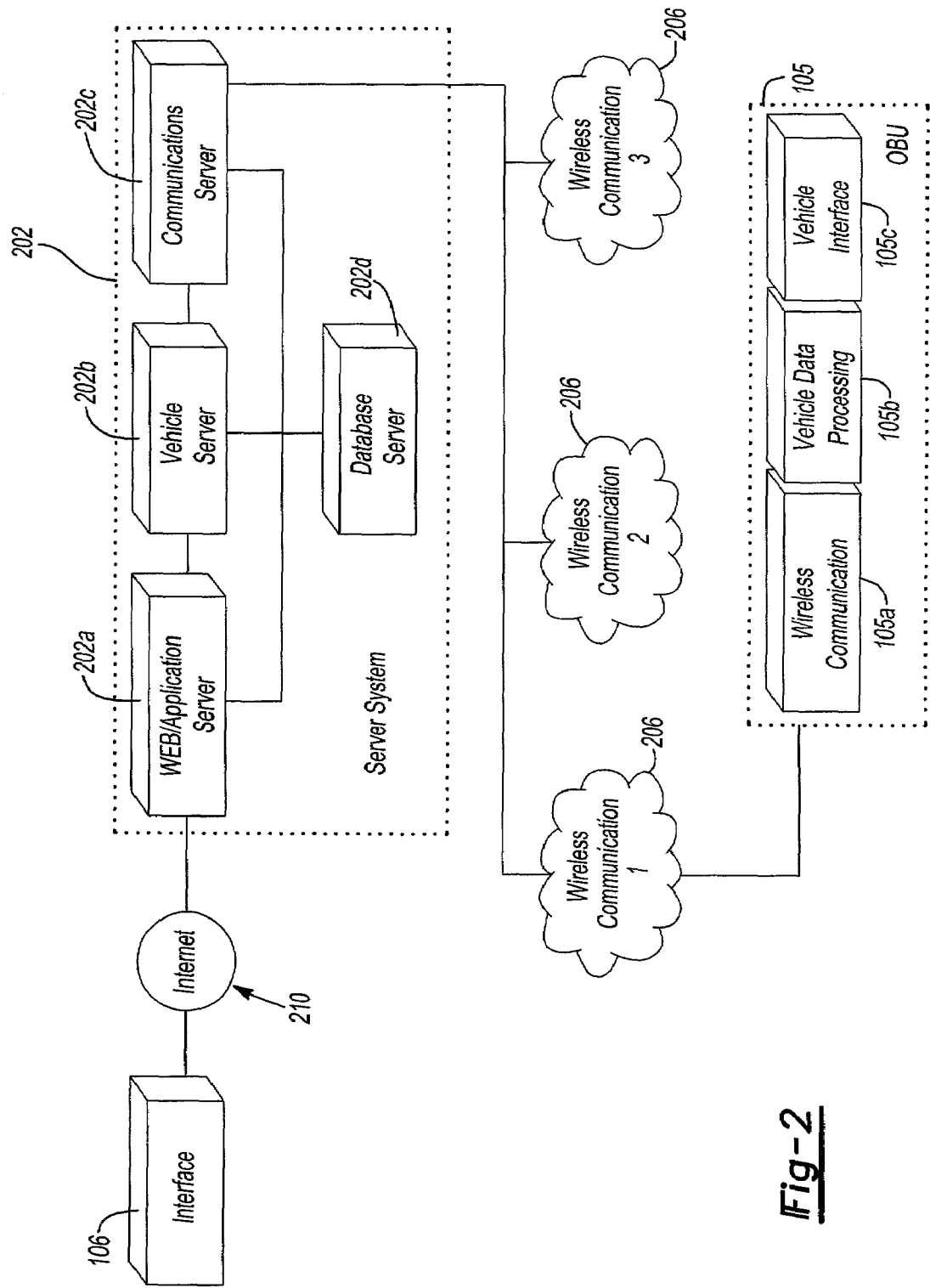
FIG. 2 is a representative block diagram illustrating a system architecture according to one embodiment of the present invention.

FIG. 2 is a representative block diagram of a system architecture 200 according to one embodiment of the present invention. The system architecture shown in FIG. 2 is one possible way for carrying out the functionalities described above and shown in FIG. 1. In this example, the architecture includes three primary components: the interface 106, a server 202, and the on-board unit (OBU) 105. All three components 106, 202, 105 are designed to communicate with each other through any known means, such as via wireless networks 206.

The interface 106 can be, for example, a user interface and/or a machine interface that allows a human or machine to access the infrastructure 102, which includes the server 202. The server 202 may include, for example, a series of servers that perform web page hosting, run applications, perform data storage, and/or perform wireless communications network management. In this example, the server 202 includes a web/application server 202a, a vehicle server 202b, and a communications server 202c, all of which are linked to a database server 202d. As shown in the Figure, the server 202 acts as a link between a web based client (user) 106 with the OBU 105, allowing user access and control to a vehicle data stream via the Internet 210 or other internetworking system.

The OBU 105 access the data from various vehicle components and may also generate vehicle data of its own to provide to the server 202. The OBU 105 may include a wireless communication module 105a to provide a communication link to a wireless network, a vehicle data processing module 105b to process data obtained from the vehicle components, and a vehicle interface 105c connected to, for example, the vehicle data bus to gather data from the vehicle components for processing and managing time or process-critical functions with the vehicle systems, such as electronic control units. The OBU 105 may also include a global positioning system and a driver display interface.

Each of the system architecture components will be described in greater detail below.

Interface

The interface 106 may be a standard browser interface and/or a machine-to-machine interface. In the browser interface, a human user accesses the system via a standard web browser. In one embodiment, the user gains access to the specific set of their authorized vehicles and functions after login and password authorization. In a machine-to-machine interface, server and vehicle data and functions may be accessible via a secure application program interface (API). A machine-to-machine interface allows other applications access to the system's 100 capabilities so they can gain remote access to the vehicle and the capabilities offered by the system. This allows the system 100 to interface with existing or planned back office applications and operations, making the system 100 suitable for integration with, for example, overall fleet operations or other systems.

Server

The server system is the fixed-based component of the system and, as explained above, can be an Internet-based system and use an ASP model. The end user can access the system from the interface 106, such as any commercially available web browser. As noted above, the server 202 in this embodiment includes the web application server 202a, the vehicle server 202b, and the communications server 202c, and the database server 202d. Each of these will be described in greater detail below.

The web application server 202a contains the logic defining one or more applications to an end user. All the data needed for a specific user application is requested and sent to the OBU 105 via the wireless communication network 206. As will be explained in greater detail below, applications perform the necessary calculations and then package the results for presentation in a defined format to the user. Further, the web application server 202 is responsible for running business applications related to user activities, which may include performing business logic, interfacing to the systems databases for fleet, vehicle, component, and transaction activity, knowledge-base storage, and sending user requested vehicle queries or functions to the vehicle server 202*b* and the communications server 202*c*.

The vehicle server 202*b* in the server 202 stores and processes vehicle-specific data and acts as a translator between the applications 108, 110 and the specific vehicle and/or vehicle component. More particularly, the vehicle server 202*b* is responsible for processing data requests and vehicle responses and converting the outbound and inbound data into translated vehicle information.

The vehicle server 202*b* translates user requests from the interface 106 into formats specific to the vehicle 104 to which the request is directed. The vehicle server 202*b* conducts this translation without any user interaction or property selections. For example, the vehicle server 202*b* may evaluate a message being sent to a particular vehicle and detect the vehicle type, the vehicle bus type, and the vehicle component or sub-component that is intended as the message recipient. The vehicle server 202*b* then packages the message according to the specific communication protocol mandated by the recipient component. As a result, the vehicle server 202*b* allows monitoring and control of different vehicles having different components through the same interface 106 for a given user and application.

As shown in FIG. 2, one embodiment of the inventive system allows communication between at least the vehicles 104 and the server 202 via a wireless network, such as a satellite or terrestrial based network. A communication server 202*c* may be included in the server 202 to support wireless communications and provide a central location for supporting changes and improvements in wireless technology. In one embodiment, the communication server 202*c* manages the communications activities between the OBU 105 and the vehicle server 202*b* and processes vehicle/component specific requests between the OBU 105 and the server 202*b*.

In one embodiment, the communications server 202*c* utilizes a wireless communications framework that provides a communication link between the server 202 and the vehicle 104. Although any wireless mobile communication system can be used in the inventive system 100, a flexible wireless communication infrastructure that is capable of handling multiple platforms and/or multiple communication providers is preferred. One possible embodiment of such a framework is described in U.S. Provisional Application No. 60/351,165 entitled "Wireless Communication Framework", filed Jan. 23, 2002, the disclosure of which is incorporated herein by reference in its entirety. To handle multiple communication providers and/or platforms, the flexible wireless communication infrastructure may abstract the needs of a specific wireless communication provider, such as the message size, message format, and specific protocol details, into a standard messaging API understandable by multiple systems and platforms. In one embodiment, the communication server 202*c* abstracts messages, and stores and forwards messages to ensure later delivery of messages to vehicles that are temporarily outside a wireless communication coverage area, and may even include least cost routing rules to select among multiple wireless networks to prioritize message routing based on cost and/or criticality of the message.

The server 202 also includes a database server 202*d* containing relational data tables designed to retain information pertaining to a user, a vehicle, a fleet, system transaction history and other relationships associated with a given vehicle 104. The database server 202*d* also may be designed to retain the data resulting from any vehicular transaction, such as transactions between the OBU 105 and the server 202. In one embodiment, the database is structured such that authorized users can access vehicles in a number of ways, for example, by fleet ownership, leasing fleet, vehicle manufacturer, and component manufacturer. This structure enables the system 100 to provide each of these beneficiaries with specific, customized data and access in a format meaningful to each user.

On Board Unit (OBU)

As noted above, the OBU 105 provides the vehicle-side, real-time computing base for the system. In one embodiment, the OBU 105 is responsible for data stream processing, discrete measurements, vehicle position information, wireless communications, and real-time analysis of data. Within the system's overall framework, the OBU 105 acts as a vehicle server, providing vehicle specific data and functionality. In one embodiment, the OBU 105 may be an expandable custom hardware platform designed and manufactured to reside on a wide variety of vehicles with different component specifications and needs and is preferably capable of running multiple applications while acting as a vehicle data gateway for others.

Figure 3B:
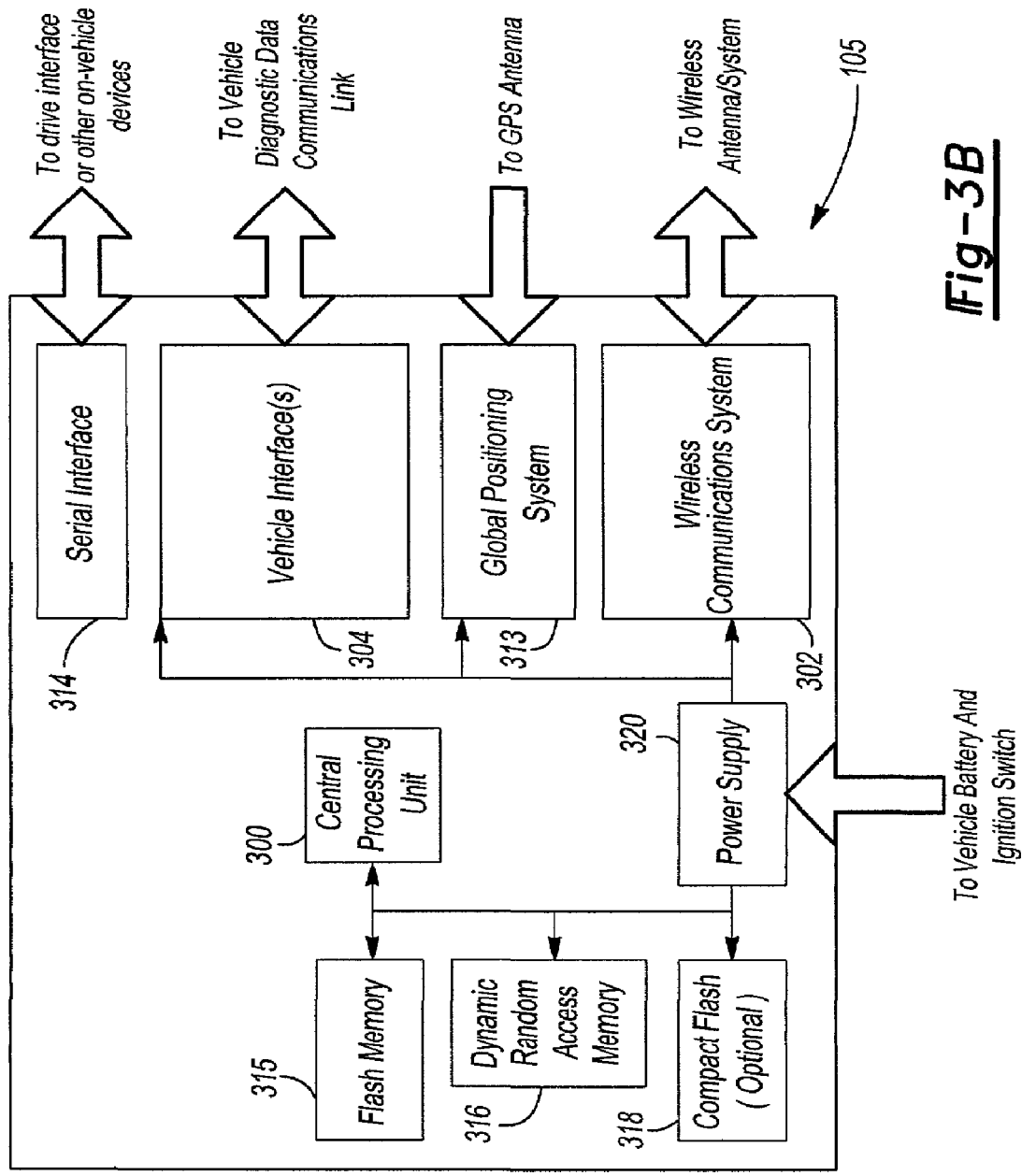

FIGS. 3A and 3B are representative high-level block diagrams of the OBU 105. One embodiment of the OBU 105 may include a data processor 300 and one or more interfaces 302, 304, 306 such as a wireless interface 302 that controls communication between the OBU 105 and the server 202 via the wireless network 206, a vehicle interface 304 that allows the OBU 105 to transmit to and receive from, for example, electronic control units (ECUs), vehicle controllers, and/or other vehicle components 308, and an optional user interface 306 that allows a user to read and/or enter information into the OBU 105.

The wireless interface 302 in one embodiment sends and receives data from the server 202 to and from the OBU 105 and abstracts communications from different wireless network devices to allow the OBU 105 to communicate with a flexible wireless communication infrastructure, such as the type described above with respect to the server 202. More particularly, the wireless interface 302 may encapsulate protocol differences among various wireless network devices to provide a standard output to the processor 300. In one embodiment, wireless network messages are routed from the server 202 to the wireless interface 302 for error checking and filtering. After filtering, commands are passed to the processor 300 and then routed to their respective vehicle components.

The processor 300 acts as the central processing unit (CPU) of the OBU 105 by managing the sending and receiving of requests between the server 202 and the vehicle 104 via the wireless interface 302. In one embodiment, the processor 300 has the logic and intelligence to carry out vehicle specific services such as diagnostic requests and processing. For example, the processor 300 may run specific applications that are loaded into the OBU's memory 315, 316, 318 and coordinates activities between the vehicle datastream, GPS unit, wireless communications, and the remote server 202. Further, in one embodiment, the processor 300 can be updated through the wireless network to add and enhance its functionality. This capability eliminates requiring the vehicle to be at the service bay for software updates that enhance features and functionality.

The vehicle interface 304 allows the OBU 105 to support a wide variety of vehicle components and subcomponents. Possible interfaces that can be supported by the OBU include SAE J1708, SAE J1939, SAE OBDII/CAN, ISO-9141, discrete I/O, proprietary interfaces, and other interfaces (e.g., discrete or instrumentation interfaces). Further, the vehicle interface 304 provides a single point of contact for all vehicle components and control devices on the vehicle 104, allowing the communication between OBU software with the vehicle's actual data bus line as well as wireless communication devices, such as a satellite-based communications system.

In one embodiment, the vehicle interface 304 may include a data parser/requester module 310 that contains software code logic that is also responsible for handling direct interfacing between the processor 300 and the vehicle data bus 307 for non-application specific (i.e., "generic" SAE J1708 or SAE1939 discrete measurement points) parameter readings, alerts, configuration or reprogramming data, as explained in greater detail below.

The vehicle interface 304 may also include, for example, one or more application specific modules 312, such as one for each manufacturer specific controller 308 within the vehicle 104, each containing software code logic that is responsible for handling interfacing between the processor 300 and the vehicle data bus 307 (via data parser/requestor module 310 in this example) for application specific parameter readings, alerts, configuration or reprogramming data.

Note that the OBU 105 may act as a server and/or data gateway for an application that places data directly on the vehicle data bus 307. In one embodiment, the OBU 105 uses an interface standard, such as TMC RP 1210A, as an element of the data gateway. Regardless of the specific standard used, any activity using the OBU 105 as a data gateway will involve data going through the processor 300.

In an embodiment of the present invention, the OBU 105 is designed to be compliant with the SAE's *Joint SAE/TMC Recommended Environmental Practices for Electronic Equipment Design (Heavy-Duty Trucks)*, Document No. J1455 (August 1994) standard, which is incorporated herein by reference in its entirety, because it will be a component included (or installed) within vehicles 104. As indicated above, the OBU 105 is not limited to be compliant with any particular standard and can accommodate any on-board electronic system standard (e.g., SAE J1708, SAE J1939, SAE J1850, ISO 9141, proprietary data streams, etc.) for any sub-system (e.g., engines, transmissions, braking systems, instrument clusters, etc.) as long as the system 100 is capable of converting commands between the interface 106 and the OBU 105 according to whatever standard is used by a given vehicle electronic system. If the vehicle electronic system uses a proprietary standard, for example, the vehicle server 202b and the associated application specific module 312 on the OBU 105 may be adapted to accommodate the proprietary standard.

FIG. 3B illustrates another embodiment of the OBU 105 and explicitly shows the capability to interface with other devices via, for example, a parallel interface, serial interface, universal serial bus (USB), satellite, terrestrial wireless (e.g., 802.11b), and/or a global positioning system (GPS). More particularly, the embodiment of the OBU 105 shown in FIG. 3B includes a GPS circuit 313 that receives signals from a GPS antenna and a serial interface 314 that communicates with a driver interface or other on-vehicle devices (not shown), such as a handheld device, a cellular telephone, voice messaging system, data logger, or other devices. FIG. 3B also explicitly illustrates a flash memory 315, a dynamic random access memory 316, and an optional compact flash memory 318 coupled to the processor 300 as well as a power supply 320 coupled to the vehicle battery and ignition switch (not shown). Those of skill in the art will understand that the elements and concepts shown in FIGS. 3A and 3B can be combined in any manner without departing from the scope of the invention.

The application software and the application framework is built with both a software and hardware abstraction layer. This approach makes the framework adaptable to a number of alternative operating system and hardware platforms. One embodiment of the OBU 105 may use any known real-time operating system.

System Operation Examples

The overall system 100 can support many possible services and applications, examples of which are described below and illustrated in FIGS. 4 through 8. As noted above, the system 100 shown in FIGS. 1 and 2 illustrate one possible relationship between services and applications for a system 100 using an ASP-based model. In one embodiment, a group of core services 350 that perform vehicle-specific operations are available to the applications 108, 110. As noted above, the applications 108, 110 allow a user to customize the interpretation and display of the vehicle-specific operations based on the user's own requirements. The core services 350 act as building blocks of services that can be selected or combined in any desired manner, and can be accessed by or with any applications 108, 110 in the system 100; in other words, the applications 108, 110 act as a functional layer over the more primitive core services 350. For example, the core services 350 may be accessed by a help desk application to obtain vehicle location along with parametric data or by a service application to obtain parametric data and to perform functional tests. Because the system 100 can leverage other applications and services that the system 100 itself may not have and couple them with its own applications and services, the system 100 provides a flexible and adaptable platform that can accommodate many different needs.

In one embodiment, the applications may assemble the core services to perform specific functions. For example, one of the core services 350 may capture measured values and/or change parameters or operational settings in the vehicle 104 while the applications 108, 110 organize and process information from the core services 350 into groupings that are meaningful to a given user. A service outlet, for example, may want different data and/or data organized in a different manner than a leasing organization or a component manufacturer.

As noted above and as shown in FIGS. 1 and 2, the interface 106 can be a browser interface or graphical user interface (GUI) that allows a human user to access the system 100, or a machine-to-machine application programming interface (API). The user interface 106 allows the system 100 to act as a gateway between the user and the vehicle(s) 104 via the applications and services.

As noted above, the core services 350 provided by the system 100 act as building blocks that can be assembled by applications in a variety of ways that can best serve the user. Possible core services 350 include:

Parameters: obtains discrete or data stream-based vehicle parameters, including standard and proprietary messages, upon user request;

Alerts: notification of the occurrence of a particular event (e.g., receipt of a trouble code or a notification of a parameter value occurring outside an acceptable parameter range);

Functions: runs functional tests on vehicle components and generates result reports;

Configuration: performs remote configuration of a vehicle or component by, for example, changing one or more vehicle parameters;

Reprogramming: performs complete reprogramming, or "re-flashing" of a selected on-vehicle controller;

Geographic location: provides vehicle location through, for example, a GPS system.

The list of core services 350 above is not meant to be exhaustive, but are simply examples of possible services that can be available directly to users or supplied to applications for further processing. Note that although the explanations below focus on obtaining data from a vehicle ECU 308, the system and functions described below are applicable for any vehicle data.

The "Parameters" service may include a simple parameter retrieval service as well as more sophisticated parameter retrieval services that address limitations in obtaining vehicle data when, for example, the vehicle is turned off. FIG. 4 illustrates one simple process 400 for obtaining a parameter. When the OBU 105 receives a command from the server 202 to retrieve a data value at block 402, the OBU 105 sends a query message to the ECU 308 to obtain the ECU's current reading at block 404. Once the ECU 308 returns a parameter value at block 406, the OBU 105 retrieves the value and forwards it to the server at block 408. Note that frequently used parameters may be packaged and transmitted to the server 202 as a single message as a more efficient way of transferring data. Further, the specific means for getting a particular data item may depend on the specific requirements of a given ECU 308. For example, as is known in the art, data points corresponding to an anti-lock brake system may be obtained in a different manner than data corresponding to engine coolant temperature.

Figure 5:
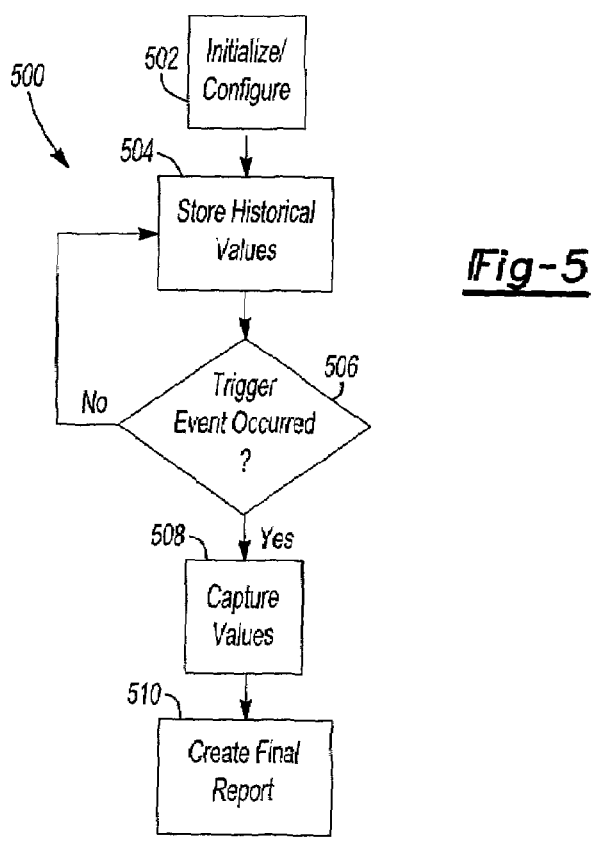
FIG. 5 is a block diagram of a parameter retrieval process according to another embodiment of the present invention.

FIG. 5 is a flowchart illustrating one possible process to be offered as a "Parameters" service that is more sophisticated that the simple parameter retrieval service explained above. Although parameter data can simply be read from the vehicle's electronic controllers and provided to the user on demand, the "Parameters" service can also provide more sophisticated parameter data capture methods such as the type shown in FIG. 5. FIG. 5 illustrates a "snapshot" process 500 for obtaining a set of parameter values over a period of time, where the reporting of the parameter values is triggered by a specified event. Offering this service as an on-vehicle diagnostic tool is particularly helpful for intermittent fault diagnosis and vehicle performance analysis. Further, gathering data sets at prescribed periodic intervals minimizes negative effects caused by inherent problems in wireless communication systems, such communications drop-out and lack of coverage, which would normally make remote diagnostics ineffective.

To carry out the snapshot process 500, the system 100 first initializes at block 502 by, for example, storing the diagnostic parameters to monitor, setting the time intervals at which parameter values are captured, selecting the number of captured values to be included in a single report, and selecting the event that will trigger reporting of the captured values. This information can be inputted into the OBU 105 via the interface 106. The parameter values to be captured can be any parameters accessible on the vehicle's electronic controllers by means of a diagnostic data stream or from discrete inputs on the OBU 105. The triggering event can be any non-continuous event that is monitored on the vehicle, such as the capture of an active trouble code from a vehicle controller or a parameter moving outside an established acceptable range.

Once the OBU 105 has been configured (block 502), the OBU 105 maintains a number of historical value sets at block 504 by caching a selected number of parameter readings during normal vehicle operation. While the OBU 105 captures the parameter readings, it also waits for the triggering event to occur. Once the trigger event occurs (block 506), the OBU 105 continues caching the configured parameter readings occurring after the event (block 508). The number of historical value sets can be, for example, half the number of captures to be included in the final report, while the number of value sets taken after the triggering event can make up the other half. Note that the OBU 105 may, in another embodiment, capture parameter readings only before or after the triggering event as well or capture different numbers of values on either side of the event.

After all of the desired value sets have been captured and collected, all of the captured readings, both before and after the event, are combined into a final report at block 510. The report can be stored on the OBU 105 for later retrieval or sent via wireless connection to the application server 202a for immediate viewing.

Figure 6:
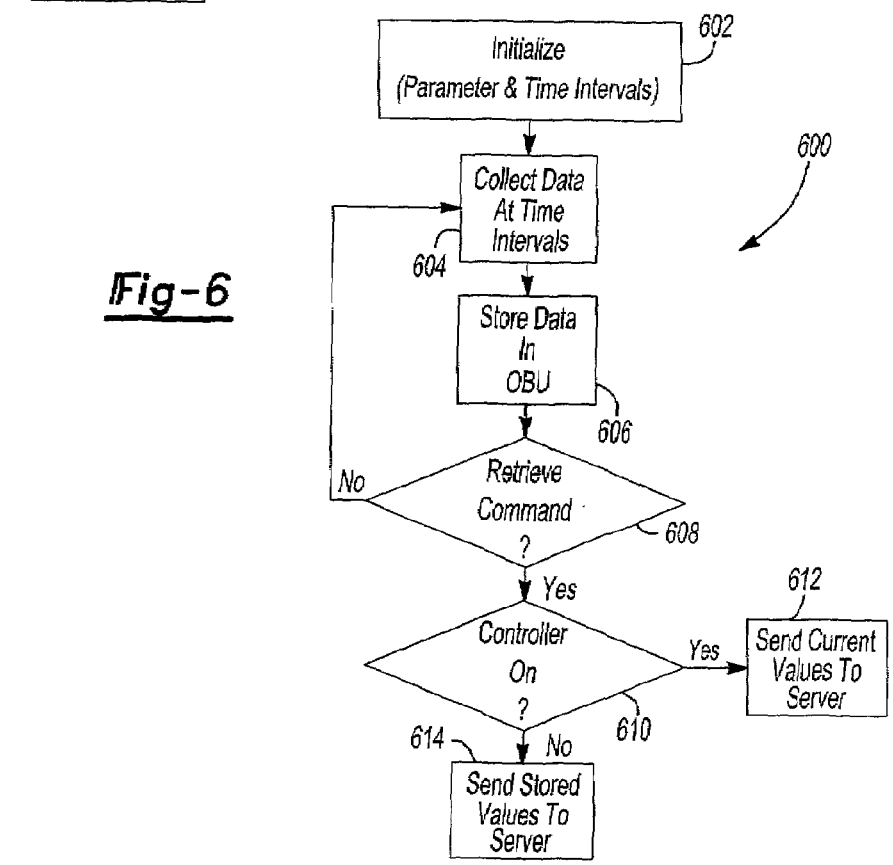
FIG. 6 is a block diagram of a parameter retrieval process according to yet another embodiment of the present invention.

Another possible process that can be offered as a "Parameters" service is a "get stored values" (GSV) process 600, as illustrated in FIG. 6, for collecting parameter values from a vehicle even if the vehicle is unable to provide current parameter values at the time of the query. The GSV process 600 addresses a situation where the vehicle controllers 308 are unable to respond to a query by the OBU 105 (e.g., while the vehicle is turned off) to respond to a query. This process is particularly useful in applications requiring remote retrieval of time-sensitive data, such as an odometer reading at the end of a scheduled period, or in any application where the vehicle operating state is unknown at the time of the query.

For the GSV process 600 to be effective, the OBU 105 should be designed to allow continuous remote access so that the OBU 105 is always ready for receiving and sending messages. The OBU 105 is initialized by receiving an instruction to periodically collect specified parameter data at a selected query time interval (block 602). After receiving this command, the OBU 105 will periodically collect data at the specified query time intervals (block 604). The values gathered by the OBU 105 are stored in the on-board unit's memory, such as a flash memory, at block 606 before the OBU 105 is shut down when the vehicle 104 is turned off.

If the OBU 105 receives a GSV "retrieve" command from the application server 202a (block 608), the OBU 105 checks the state of the vehicle controller 308 at block 610. If the vehicle controller 308 is accessible, then the OBU 105 collects the current values from the vehicle controller 308 at that time and sends the collected current values to the server 202. If the vehicle controller 308 is not available at the time of the command (e.g., if the vehicle is turned off), making the current values of the controller 308 unretrievable, the saved values in the OBU 105 are sent back to the server 202 as the retrieved values (block 612).

By periodically collecting data at selected intervals while the vehicle controller is operational, the OBU 105 can at least obtain recent vehicle controller parameter readings before the controller 308 is inaccessible at some later time. As a result, the GSV process 600 allows the remote server 202 to obtain the most recent controller data if current data is not available at the time of the query. In short, the GSV process 600 returns the last known value in memory to the server 202 if the vehicle is turned on and will retrieve a backup value, which may still be the last known value in memory, if the vehicle is turned off.

Multiple "Alerts" services may also be provided as a core service in the system 100. In its simplest form, the "Alert" service monitors vehicle trouble codes and transmits a message to the OBU 105 when the trouble code occurs. For example, a fault code may come as solicited or unsolicited, depending on how the controller 308 in the OBU 105 is instructed to handle faults. To obtain an unsolicited fault, the OBU 105 monitors the vehicle data bus 307 for the occurrence of a fault and notifies the server 202 if a fault occurs. If only a set of individual faults are monitored, additional parsing shall be performed to filter out unwanted faults. For example, if a user only wishes to be informed of fault codes corresponding to a component breakdown, as opposed to being informed of all fault codes, the user can indicate this preference via the interface 106.

To obtain a solicited fault, the user may set up periodic queries to the OBU processor 300 in addition to setup notification. Note that the response message may match the message template even if no fault actually existed; in this case, additional parsing of the response message may be necessary to obtain useful information. For example, if the user solicits a request for information, the user may obtain a response based upon the criteria of that request, which may be different than the criteria for unsolicited notifications.

If desired, the "Alert" service may include additional functions such as providing the ability to add/remove individual faults, canceling the alert function for a given fault when a fault alert is fired so that only the first fault occurrence (and not subsequent fault occurrences) trigger a notification message, or configuring the "Alert" service to be stored permanently in, for example, the database server 202*d* until the user removes the service or until the service is cancelled by a fault occurrence.

With respect to the example shown in FIG. 7 and as noted above, the "Alerts" service may include among its functions the detection of a particular event by checking whether a monitored value exceeds a selected threshold. Note that although this example focuses on one diagnostic parameter, any number of diagnostic parameters may be combined into an algorithm to detect threshold limit boundaries. Further, values may be monitored over time, rather than as one single alert-triggering event, to monitor patterns and trends and to detect events more accurately.

As an example of a "Alert" service that monitors over time, FIG. 7 shows an "Over RPM" threshold alert example that detects if a vehicle driver is abusing the vehicle engine. In this example, the Over RPM threshold alert considers the amount of time that the RPM level exceeds a specified limit (6000 RPM in this example) rather than simply generating an alert each time the RPM exceeds the level. The time delay ensures that alerts are generated only for events that may cause genuine concern.

As shown in FIG. 7 if the RPM exceeds 6000 RPM for a brief period that is less than 2 seconds (at 702), the "Alert" service does not generate an alert. However, if the RPM does exceed 6000 RPM for more than two seconds (at 704), the service fires an alert 707 and resets itself (at 708) when the RPM drops back below 6000 RPM. The actual circuitry for monitoring RPM and implementing this example of the "Alert" service in the system 100 (e.g., on the OBU 105) is well within the skill of those in the art. Further, the time delay concept shown in FIG. 7 can be used for any parameter where undesirable operation is preferably detected via time and value thresholds.

The "Alert" services may also include a tamper alert feature, as shown in FIG. 8, that allows the user to monitor any unauthorized alteration of configurable parameters. This feature 800 generally contains a setup process 802 and a tamper check process 804. When a user requests the tamper alert service (block 806), OBU 105 captures the value of the parameter at the time of the request and saves the parameter value to a file in the OBU's memory (e.g., flash memory 315 or DRAM 316) at block 808. Note that this parameter retrieval process may involve using the "Parameters" service as explained above to query the ECU or other vehicle controller or component 308.

The actual tamper check process is conducted when, for example, the vehicle is initially turned on. At this point, the OBU 105 checks the parameter again to get its current value at the time the vehicle ignition is turned on (block 810). If the current value is different than the saved value (block 812), a tamper alert message will be returned to the user (block 814). If the compared values are the same at block 812, however, the vehicle continues operation as usual without transmitting any tamper alert signal (block 816). In one embodiment, the user may add/remove individual tamper alerts, and the tamper alert may be cancelled at block 818 once the alert is fired.

A "Change Parameters" function may also be included as part of a configuration core service, as shown in FIG. 9. This feature may allow a user to remotely insert or update, for example, a parameter or message definition in the vehicle. As shown in FIG. 9, the function 850 includes receiving a parameter change request (block 852), receiving the specific parameter to be changed in the vehicle (block 854), changing the parameter (block 856), and saving the parameter in memory (block 858). In one embodiment, the updated parameter definitions are stored permanently in memory until the next change request. Further, in one embodiment, the updated definition takes effect as soon as the update is completed.

The core services can be accessed by one or more applications, as noted above. The system 100 may include the ability to leverage other services that it may or may not have, such as, Fuel Tax Reporting/State Line Crossing applications, Asset tracking/utilization programs, Driver Performance applications, On-line Vehicle Documentation, detailed mapping applications, etc. This flexibility, coupled with modular services and applications 108, 110 that can be added, subtracted, and combined at will, provides for a very flexible and adaptable platform.

Applications

As described above, the system 100 allows users to customize their own vehicle monitoring, programming and diagnostics systems based on their own specialized needs by offering a plurality of applications that can be selected and combined in a modular fashion as desired by the user. The applications may include service offerings such as Remote Diagnostics, Fuel Economy, Trip Reporting, Automatic Vehicle Location based upon GPS or satellite based system information, and others. The applications listed here and described in greater detail below are only examples and are not meant to be limiting or comprehensive in any manner. Those of skill in the art will understand that other applications may also be included as possible application options.

A "Remote Diagnostics" application, for example, provides the ability to perform component analysis before or during a vehicle breakdown and allows vehicle maintenance locations to receive parametric information from a vehicle prior to its arrival, or prior to dispatching a technician to the vehicle. Further, the "Remote Diagnostics" application allows a technician to perform selected diagnostic tests on the vehicle or system, with the test process being managed by the OBU 105. In one embodiment, the "Remote Diagnostics" application allows a user to view parameters, active and inactive fault codes, and vehicle configurations, for example, and may also allow authorized users to perform functional tests and configuration changes on the vehicle. Remote Diagnostics may be initiated when, for example, a vehicle notifies the fleet based upon a series of established alerts or when the diagnostics are requested manually by a fleet authorized user. In practice, the application may provide diagnostic applications via the inventive system 100. When the user logs on to the system 100 via the interface 106, for example, he or she may be presented with a list of vehicles that have reported alerts or notifications that may need attention. If no alerts are active, the user is provided a list of vehicles for which he or she is responsible. At this point the user may elect to use a remote diagnostics application, such as the remote diagnostics application described below and shown in FIG. 10, 912, to perform further analysis on the vehicle to determine the severity of the problem.

Figure 10:
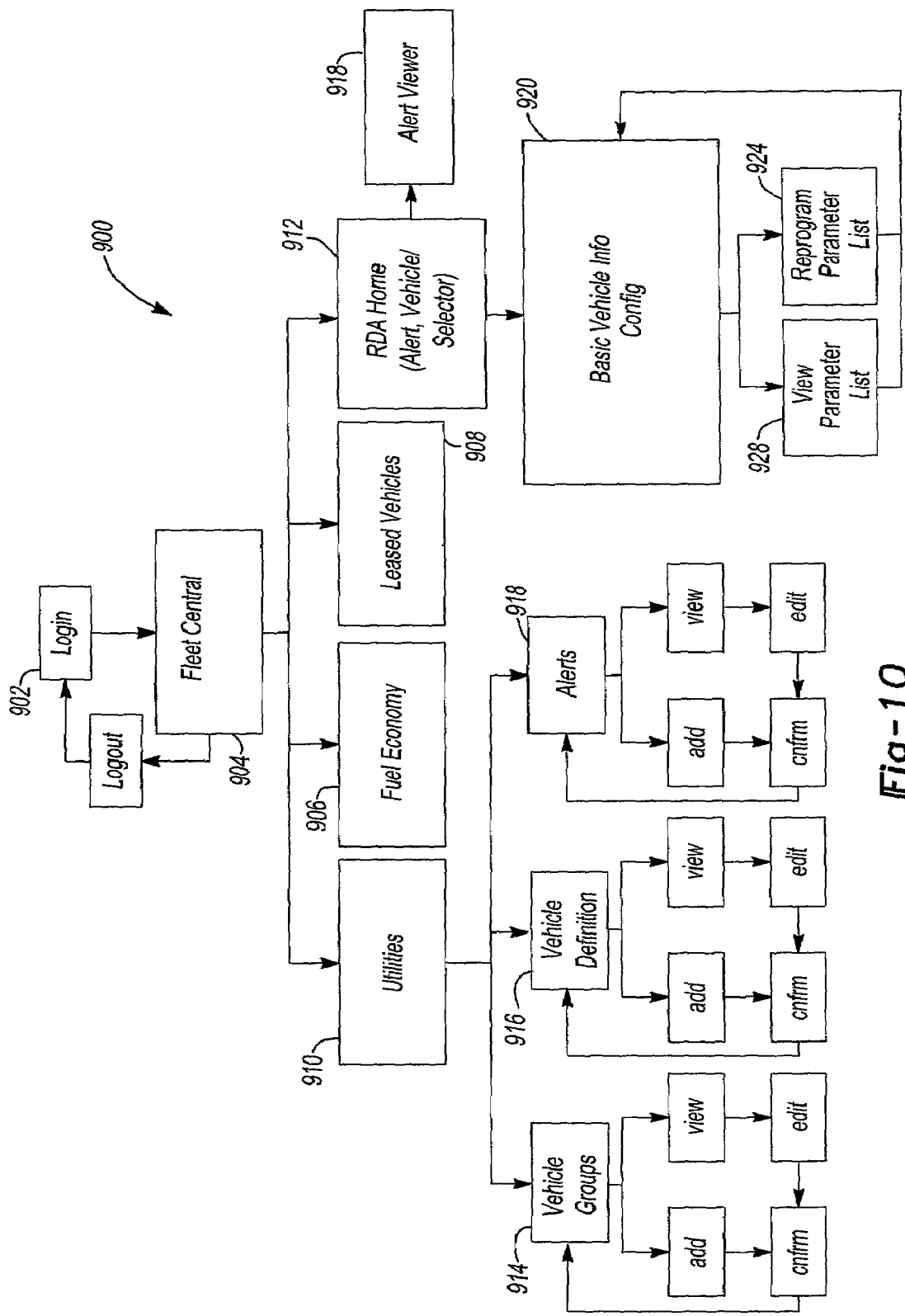
FIG. 10 is a block diagram illustrating one possible architecture for a remote diagnostics application to be used in one embodiment of the present invention.

FIG. 10 is a block diagram illustrating one possible overall web site architecture 900 that includes a remote diagnostics application. In this example, a user may log into the application (block 902) to reach an application home page 904. From the home page, the user may access a range of information, such as fuel economy 906 or leased vehicle information 908, or access utilities 910 or a remote diagnostics application (RDA) page 912 to monitor, diagnose, and/or reprogram vehicle parameters. In this example, the utilities 910 allow the user to define and/or modify vehicle groups 914, specific vehicles 916, and alerts 918. The RDA page 912 provides users with access to, for example, vehicle information and parameters 920, including pages that allowing parameter viewing 922 and reprogramming 924. Note that other architectures and implementations are possible for this application as well as other applications without departing from the scope of the invention.

Figure 11:
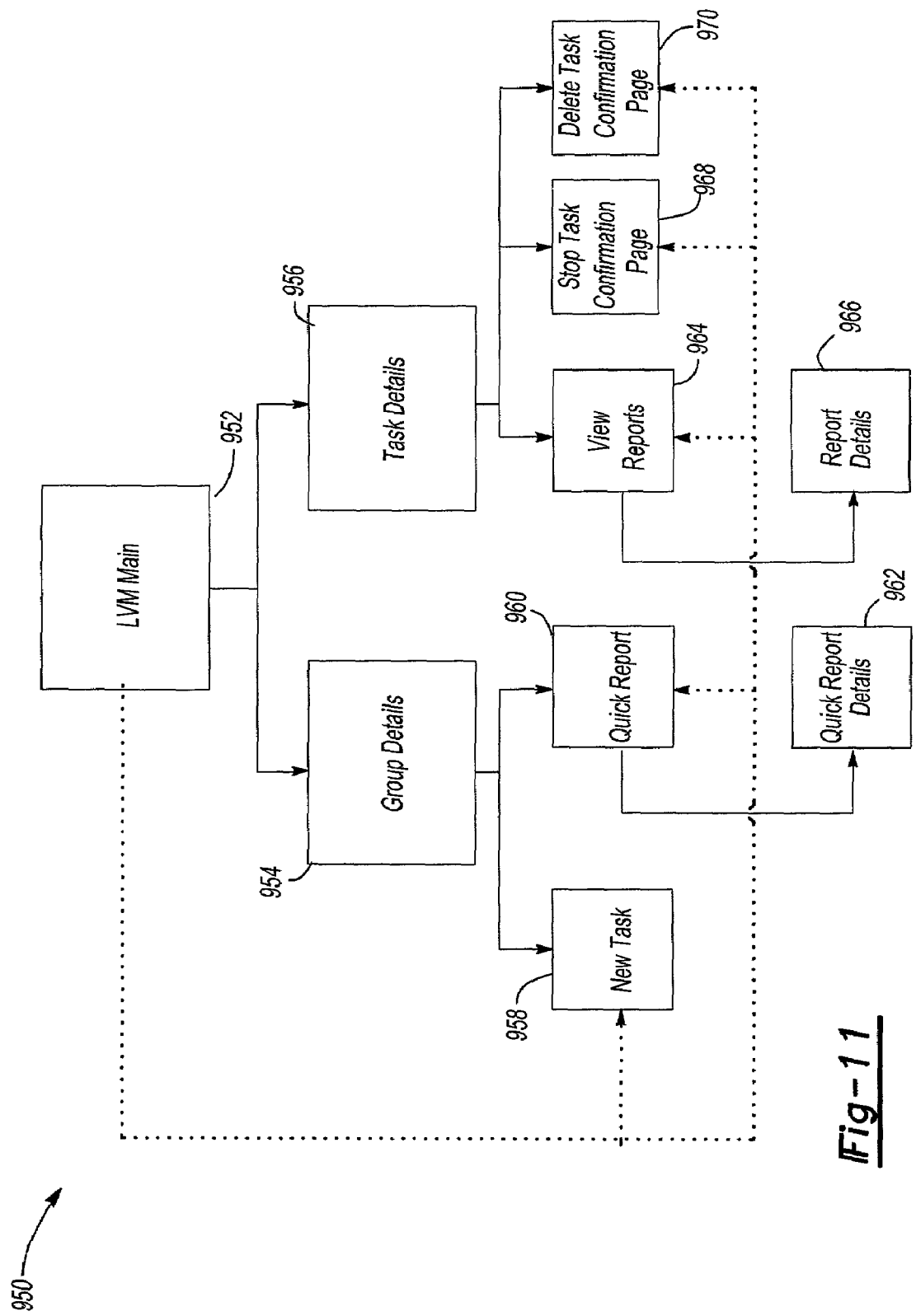
FIG. 11 is a block diagram illustrating one possible architecture of a leased vehicle management application to used in one embodiment of the present invention.

A "Leased Vehicle Management" (LVM) application is another possible option to generate periodic status reports summarizing selected parameters for each vehicle in a fleet, such as total vehicle distance, total idle fuel, total idle time, total fuel used, and/or total fuel economy. FIG. 11 is a block diagram illustrating one possible example architecture for the Leased Vehicle Management application 950. In this example, the user reaches a main page 952 that allows the user to choose between a group details page 954 and the task details page 956. Group details 954 correspond to all information for a selected vehicle group, while task details 956 correspond to all information for a selected task. The group details page 954 may allow the user to, for example, create new tasks (e.g., the timing of data collection for a selected vehicle group) 958, generate a report list 960, or generate more detailed reports listing specifying, for example, parameter values for a selected report 962. The task details page includes similar options, allowing the user to view reports for a selected task 964 and generate more detailed reports 966. The task details page 956 also allows a user to stop a task 968 or delete a task 970.

An "Engine Management" application may also be an option to target fleets whose vehicles encounter varying road and traffic conditions, and varying load types and weights. The objective of the "Engine Management" application is to improve overall fleet fuel economy via dynamic control of a vehicle's operational characteristics, in particular, horsepower ratings and maximum road speed limits. Traditionally such operating parameters have been established once at a fleet wide level, not taking into consideration some of the variables listed above. In addition, making these changes required physical contact with the vehicle, necessitating undesirable vehicle downtime. Dynamic adjustments based upon operating conditions can provide reductions in vehicle operational costs, thus resulting in significant savings at a fleet level. With this application the user will be able to dynamically configure the vehicle wherever it may be; tailoring its operational characteristics based upon route, load, and other vehicle operation factors. The "Engine Management" application may include both measured parameters and programmable parameters. Examples of programmable parameters include Vehicle Road Speed Limit, Engine Horsepower/Torque, Engine Idle Shutdown Time and Cruise Control Settings.

A "Trip Report" application may also be provided as an option. This application allows the fleet manager to obtain trip information from the vehicle on a near-real-time basis. The user can analyze trip information for single vehicles as well as any increment of their fleet. This application primarily uses measured parameters such as odometer readings, total trip fuel, idle fuel, average fuel economy, vehicle route taken, and others. It also uses some parameters to derive data, such as total idle hours and the type of idle hours recorded. The output from this application can also be used as input to the billing systems of leasing companies who charge customers based upon mileage.

A "Maintenance Alert" application allows the fleet manager to establish a series of maintenance triggers based upon key parameters. When a parameter threshold is encountered, the fleet manager will be notified automatically by the system, thus initiating a maintenance event without physical contact with the vehicle. For example, a fleet may establish a preventive maintenance cycle based upon odometer reading. If the server 202 is made aware of the interval, it can notify the fleet of the precise moment when that interval occurs. Alerts may provide notification on parameters such as diagnostic codes, fluid levels and parameter ranges as well as unauthorized tampering with the vehicle.

A "Vehicle Configuration" application may be offered to allow a fleet manager to set certain parameters for multiple vehicles in a fleet so that the selected vehicles will operate within its established standards. Examples of parameters include horsepower ratings, maximum road speed limits, maximum and minimum cruise control set speeds and maximum engine idle time before shutdown. Traditionally, this step has required a physical connection of a diagnostic application or tool to the vehicle, but physical connections are time-consuming and require the same step to be repeated on every vehicle that is serviced. The wireless nature of the "Vehicle Configuration" application allows operational settings and alerts for several vehicles within a fleet at one time by allowing the user to identify selected vehicles, set parameters, and initiate an automated process where each vehicle is systematically configured with the same parameter settings.

A "Warranty Management" application may also be offered as part of a data mining strategy used by, for example, original equipment manufacturers (OEMs) to help diagnose warranty relationships between major components or to assess warranty claims for validity. This application would, for example, obtain detailed vehicle data from the database server 202*d*, using both fleet specific and system-wide data mining, and then correlate the data with warranty requirements.

As noted above, the possible modular applications described herein are meant as illustrative examples only. Further, as noted above, the applications 108, 110 accessed by the infrastructure 102 can be generated by third parties and offered as modules for incorporating into a particular user's interface 106 and accessing the OBU 105 and other system-supported core services and applications. The modular functionality offered by independent applications 108, 110 allows disparate users to access the same vehicle data via the same OBUs 105 and the same infrastructure 102, but be offered customized data, functionalities, and interfaces that are meaningful to that user's industry as determined by the particular modular applications selected by the user. The specific manner for implementing the applications via, for example, computer programs, is within those of skill in the art.

The inventive system therefore provides a modular wireless vehicle diagnostics, command and control system that is customizable to a user's specifications. More particularly, the modular applications 108, 110 provide much versatility and allow users from disparate industries to use the same overall inventive system 100 by selecting the applications 108, 110 relevant to their particular industry. Further, by creating a wireless diagnostics and command and control service, the invention provides real-time remote access to vehicles and vehicle systems via, for example, the Internet and wireless networks. In one embodiment, the inventive system allows users to connect to multiple data points on any given vehicle to interpret and analyze the vehicle data in real time, change vehicle parameters as needed and create historical databases to guide future decisions. Further, by monitoring vehicle operation in real time and providing customized reports for each vehicle, the inventive system achieves high operating efficiency, lowered maintenance costs and downtime, and even allows pre-ordering of parts as vehicles approach scheduled maintenance.

Note that the capabilities described above are meant to be illustrative and not limiting. The system 100 can be adapted to, for example, establish a setting that is applied to selected group of vehicles with a single command rather than individually establishing a setting for each vehicle. The aspects of the request, including authorization, vehicle/component differences, password differences, and configuration limitations of the specific request, may be managed by, for example, the server 202. In another embodiment, the system 100 can view each vehicle 104 as a single entity to allow the user to communicate with multiple ECU's on the same vehicle 104 at the same time. For example, data can be obtained from an Engine ECU and Transmission ECU at the same time, with the resultant data from each controller correlated to the other to add more detail to the data offered to the user.

Variations of the system described above are possible without departing from the scope of the invention. For example, selected applications may be run locally on proprietary equipment owned by the customers (i.e., the fleet managers, vehicle distributors, vehicle dealers and the like) as a stand alone software application instead of over the Internet. Further, the OBU 105 can be equipped with, for example, a bar code scanner and/or other human user interface to facilitate data capture. Other user interfaces and functions, such as a handheld diagnostics tool, workflow integration tool, links between data captured by different applications, and tools to provide advance warning of vehicle faults or pre-arrival diagnostics information may also be included as application modules or core services or even integrated within the application modules themselves. Note that one or more additional servers can also be incorporated into the system to, for example, accommodate additional data management functions and/or provide interfaces for integrating with existing applications.

Information obtained via the inventive system can also be used to, for example, re-calibrate vehicle components, perform firmware downloads, perform component failure analysis, determine wear characteristics, analyze quality of components used in their manufacturing processes, retrieve and manage warranty information, receive indications of vehicle maintenance needs, monitor vehicle use and abuse, and/or monitor lessee trip information, perform proactive data analysis, perform pre-arrival diagnostics, re-calibrate vehicle components, and/or perform firmware downloads. Note that this list of options is not exhaustive and those of skill in the art will understand that other variations in the data obtained via the inventive system and how the data is presented and used can vary without departing from the scope of the invention.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A system for monitoring, configuring, programming and/or diagnosing operation of at least one vehicle, comprising:
    an on-board unit disposed on the vehicle to send and receive data corresponding to at least one vehicle operating characteristic;
    a plurality of modular applications, each application having an associated function that processes the data corresponding to said at least one vehicle operating characteristic obtained via the on-board unit; and
    an interface that allows selection among the plurality of modular applications to create a customized system;
    wherein each of the modular applications comprises an application selected from the group of applications consisting of third-party applications, system-supplied applications, and core services, at least one of the third-party applications and system-supplied applications functioning using information from at least one core service; and
    wherein the core services include a get stored values service that outputs at least one vehicle controller value in response to a request, wherein the get stored values service outputs a current vehicle controller value if the vehicle controller is available at the time of the request and output a stored vehicle controller value in the on-board unit if the vehicle controller is not available at the time of the request.

2. The system of claim 1, wherein the on-board unit includes:
    at least one on-board unit interface to support communication between the on-board unit and at least one device outside the on-board unit;
    a processor that manages the data sent and received by the on-board unit via said at least one interface; and
    a memory coupled to the processor.

3. The system of claim 2, wherein said at least one on-board unit interface comprises at least one interface selected from the group of interfaces consisting of:
- a wireless interface that supports communication with a wireless communication system;
- a vehicle interface that supports communication with at least one vehicle component via a vehicle data bus;
- a user interface that supports communication with a user;
- a serial interface that supports communication with at least one of a driver interface and an on-vehicle device; and
- a global positioning interface that supports communication with a global positioning system (GPS) device.

4. The system of claim 3, wherein the vehicle interface includes at least one logic module selected from the group of modules consisting of:
- a data parser/requester module that handles non-application specific interfacing between the processor and the vehicle data bus; and
- an application specific module coupled to the data parser/requestor module that handles application specific interfacing between the processor and the vehicle data bus.

5. The system of claim 1, wherein the core services include a snapshot service that obtains a set of vehicle parameter values over time.

6. The system of claim 5, wherein the snapshot service causes the on-board unit to cache a selected number of parameter readings with respect to a triggering event.

7. The system of claim 6, wherein the on-board unit caches the selected number of parameter readings by storing a plurality of parameter readings at selected time intervals.

8. The system of claim 1, wherein the get stored values service collects vehicle controller values at a selected time interval and stores a most recent vehicle controller value as the current vehicle controller value.

9. The system of claim 1, wherein the core services include an alert service that detects at least one of a solicited fault and an unsolicited fault.

10. The system of claim 9, wherein the alert service detects a solicited fault by filtering faults and outputting only faults solicited by a user.

11. The system of claim 9, wherein the alert service includes at least one of the functions from the group consisting of adding and removing individual faults, canceling the alert service for a given fault after an alert has been fired, firing an alert after a parameter exceeds a selected threshold for a selected time period, and comparing a saved parameter with a current parameter to detect tampering.

12. The system of claim 1, wherein the core services include a change parameter service that changes at least one vehicle parameter in response to a request.

13. The system of claim 1, wherein the interface is at least one selected from the group consisting of:
- a user interface that supports interaction with a human user; and
- a machine-to-machine interface.

14. The system of claim 13, wherein the user interface is a graphical user interface.

15. The system of claim 1, further comprising a server linking the on board unit to the interface via the modular applications.

16. The system of claim 15, wherein the server includes at least one server selected from the group of servers consisting of:
- a web/application server containing logic defining the modular applications;
- a vehicle server that acts as a translator between the modular applications and the on-board unit;
- a communications server to support communication via a wireless network; and
- a database server containing at least one relational data table retaining information associated with the vehicle.

17. The system of claim 15, wherein at least one of the server and the modular applications form an application service provider (ASP) infrastructure.

18. The system of claim 1, wherein the plurality of modular applications include a remote diagnostics application.

19. The system of claim 1, wherein the plurality of modular applications include a leased vehicle management application.

20. The system of claim 1, wherein the plurality of modular applications includes at least one from the group consisting of a remote diagnostics application, a leased vehicle management application, a fuel economy application, a vehicle locating application, a trip reporting application, an engine management application, a maintenance alert application, a vehicle configuration application, and a warranty management application.

21. The system of claim 1, wherein at least one of the plurality of modular applications correlates data between at least two vehicle controllers on the same vehicle.

22. The system of claim 1, wherein at least one of the plurality of modular applications establishes a setting for a plurality of vehicles with one command sent via the interface.

23. A method for monitoring, configuring, programming or diagnosing operation of at least one vehicle, comprising:
- obtaining data corresponding to at least one vehicle operating characteristic from an on-board unit on the vehicle;
- providing a plurality of modular applications that are selectable by the user to create a customized system;
- processing the data corresponding to at least one vehicle operating characteristic obtained via the on-board unit according to at least one function associated with at least one selected modular application;
- detecting a request for a vehicle controller value;
- outputting a current vehicle controller value if a vehicle controller is available at the time of the request; and
- output a stored vehicle controller value if the vehicle controller is not available at the time of the request.

24. The method of claim 23, further comprising obtaining a set of vehicle parameter values over time.

25. The method of claim 24, wherein the obtaining step includes:
- detecting a triggering event; and
- caching a selected number of parameter readings with respect to a triggering event.

26. The method of claim 25, wherein the caching step includes storing a plurality of parameter readings at selected time intervals.

27. The method of claim 23, further comprising collecting vehicle controller values at a selected time interval and storing a most recent vehicle controller value as the current vehicle controller value.

28. The method of claim 23, further comprising:
- detecting at least one of a solicited fault and an unsolicited fault; and firing an alert after the detecting step.

29. The method of claim 28, wherein detecting a solicited fault includes filtering faults to output only faults solicited by a user.

30. The method of claim 28, further comprising at least one step selected from the group consisting of adding and removing individual faults, canceling the alert service for a given fault after an alert has been fired, firing an alert after a parameter exceeds a selected threshold for a selected time period, and comparing a saved parameter with a current parameter to detect tampering.

31. The method of claim 23, further comprising changing at least one vehicle parameter in response to a request.

32. The method of claim 23, further comprising translating data between the modular applications and the on-board unit.

33. The method of claim 23, wherein the providing step includes providing a remote diagnostics application.

34. The method of claim 23, wherein the providing step includes providing a leased vehicle management application.

35. The method of claim 23, wherein the providing step provides at least one from the group consisting of a remote diagnostics application, a leased vehicle management application, a fuel economy application, a vehicle locating application, a trip reporting application, an engine management application, a maintenance alert application, a vehicle configuration application, and a warranty management application.

36. The method of claim 23, further comprising correlating data between at least two vehicle controllers on the same vehicle.

37. The method of claim 23, wherein at least one of the plurality of modular applications establishes a setting for a plurality of vehicles with one command sent via the interface.

* * * * *